United States Patent [19]

Norman et al.

[11] Patent Number: 5,178,954
[45] Date of Patent: Jan. 12, 1993

[54] MAGNETIC RECORDING MEDIUM HAVING A METALLIC MAGNETIC THIN FILM LAYER, A PRIMER LAYER COMPRISING AN AMINO ALKOXYSILANE AND A LUBRICANT LAYER COMPRISING A FUNCTIONAL PERFLUOROPOLYETHER

[75] Inventors: Colin F. W. Norman; Timothy G. E. Swales, both of Herts, England

[73] Assignee: Minnesota Mining and Manufacturing Company, St. Paul, Minn.

[21] Appl. No.: 542,190

[22] Filed: Jun. 21, 1990

[30] Foreign Application Priority Data

Jul. 21, 1989 [GB] United Kingdom ............... 89-16739

[51] Int. Cl.$^5$ ............................................. G11B 5/00
[52] U.S. Cl. .................................... 428/422; 428/447; 428/450; 428/694; 428/695; 428/900
[58] Field of Search ............... 428/694, 695, 900, 422, 428/421, 447, 450, 704, 64

[56] References Cited

U.S. PATENT DOCUMENTS

| | | | |
|---|---|---|---|
| 4,118,536 | 10/1978 | Beardsley et al. | 428/413 |
| 4,267,238 | 4/1981 | Chernega | 428/422 |
| 4,323,591 | 4/1982 | Wendling et al. | 427/53.1 |
| 4,378,250 | 3/1983 | Treadway et al. | 106/287.11 |
| 4,404,247 | 9/1983 | Dominguez-Burguette et al. | 428/213 |
| 4,526,833 | 7/1985 | Burguette et al. | 428/336 |
| 4,529,659 | 7/1985 | Hoshino et al. | 428/422 |
| 4,567,073 | 1/1986 | Larson et al. | 428/40 |
| 4,729,924 | 3/1988 | Skorjanec et al. | 428/422 |
| 4,729,938 | 3/1988 | Tajima et al. | 430/272 |
| 4,849,305 | 7/1989 | Yanagisawa | 428/695 |
| 4,960,809 | 10/1990 | Yamaya et al. | 524/188 |

FOREIGN PATENT DOCUMENTS

| | | |
|---|---|---|
| 0186427 | 2/1986 | European Pat. Off. . |
| 59-127230 | 7/1984 | Japan . |
| 60-029934 | 2/1985 | Japan . |
| 60-038729 | 2/1985 | Japan . |
| 60-212823 | 10/1985 | Japan . |

Primary Examiner—Paul J. Thibodeau
Assistant Examiner—Stevan A. Resan
Attorney, Agent, or Firm—Gary L. Griswold; Walter N. Kirn; David B. Kagan

[57] ABSTRACT

A two-layer protective coating covers a metallic thin film magnetic recording medium of a magnetic recording element. The two-layer protective coating comprises a primer layer proximal to the metallic thin film magnetic recording medium. The primer layer comprises an amino functional alkoxy silane and a copolymerizable monomer. The copolymerizable monomer comprises a plurality of vinyl groups. The two-layer protective coating also comprises a lubricant layer distal from the metallic thin film magnetic recording medium. The lubricant layer comprises a functional perfluoropolyether.

11 Claims, No Drawings

MAGNETIC RECORDING MEDIUM HAVING A METALLIC MAGNETIC THIN FILM LAYER, A PRIMER LAYER COMPRISING AN AMINO ALKOXYSILANE AND A LUBRICANT LAYER COMPRISING A FUNCTIONAL PERFLUOROPOLYETHER

FIELD OF THE INVENTION

This invention relates to magnetic recording media and in particular to protective layers which enhance the lifetime durability of magnetic recording media.

BACKGROUND OF THE INVENTION

Since 1950, rapid improvements in the field of magnetic recording have been achieved. This highly developed method of magnetic recording involves the use of a particulate magnetic construction, which utilizes magnetization directions predominantly in the plane of the medium. Improvements that have been made include improved head design, the use of media with higher coercivities and smoother surfaces.

One of the main aims of research into magnetic recording systems has been to increase information densities or storage capacity. The degree of storage that is possible is related to the packing density of the magnetic materials in the particulate constructions. A current system of magnetic recording employs small discrete magnetic particles, dispersed in an organic binder. However, due to rapid improvements in this technology the amount of information that can be recorded is now reaching its theoretical limit. Hence other methods of increasing the magnetic density are being investigated.

One type of recording media of interest is perpendicular recording. This particular technology is possible due to the discovery that certain continuous magnetic films such as CoCr, have a perpendicularly orientated crystalline anistropy, which is large enough to overcome demagnetization. High density packing can be achieved due to the CoCr alloy microstructure, which provides magnetically isolated small grains. The grain diameter is approximately 50 nm, employing a maximum density of approximately 500 kilo flux changes per inch (200 kilo flux changes per centimetre). Due to this property of the alloy, much higher densities can be achieved compared to conventional particulate systems, with an additional advantage of a much smoother surface, and hence improved head to media contact. Such media are referred to herein as metallic thin film magnetic media.

The magnetic thin film magnetic media can be formed by sputtering, evaporation, etc., from many different suitable alloys, such as CoCr, CoNi, CoCrNi etc. However, although these metallic films are very promising as high density recording media, they are susceptible to surface abrasion, and additionally cause excessive head wear. Transducer heads contacting the metallic thin film will have a tendency to erode or otherwise damage the metallic thin film. Even slight erosion will result in considerable loss of data when high bit density recording is employed. Applications likely to cause erosion and severe wear of metallic thin film media are on the increase, with video tape and electronic cameras being two examples. It is therefore essential to protect the media with some form of protective coating. However, due to losses that occur in the recording and reading processes when the recording or reading head is separated from the magnetic layer, it is desirable what the total thickness of any overlying layers on the recording layer should be less than 20 nm.

Various attempts have been made to alleviate the problem of alloy wear.

Lubricating systems that have been used as protecting layers for thin film magnetic media include metal layers, using various soft and hard non-magnetic metals, organic layers and mixtures of both. These layers have been applied using various techniques. Metallic layers are usually sputter or vapor deposited, whereas the organic materials are generally coated from solvent, using techniques such as dip coating or spin coating.

Different types of single layer metallic protective coatings are disclosed in Japanese Patent Application Nos. JP62-112211, JP62-112210, JP61-210516, JP61-104317 and JP61-123015.

Multi-layer metallic protective systems are disclosed in Japanese Patent Application Nos. JP60-229223, JP61-120341 and JP61-211826. However, although these materials offer improved durability and system endurance for the thin magnetic media, compared to the magnetic surface with no protection, these hard protective layers may still inflict severe head abrasion. Another disadvantage in using such a system is the cost of producing such metallic protecting layers. Therefore, a great deal of research has been directed towards totally or partially solvent coated lubricant systems.

Organic lubricants e.g., fatty acids and esters, such as carnauba wax have been used as protective lubricating layers both for thin film magnetic media and media comprising particulate material dispersed in a binder. These materials were considered to be satisfactory at ordinary ambient conditions, but were not reliable at high temperatures and relative humidities, e.g. 40° C. and 80% RH. Also, it was discovered that minor variations during the use of these materials, such as in the coating concentration, can destroy their utility. Minor improvements were obtained with silicones, as disclosed in U.S. Pat. No. 2,654,681. These were usable at higher temperatures and humidities, but still were not entirely satisfactory.

U.S. Pat. No. 3,490,946 discloses the use of fluorocarbon compounds as lubricants for flexible magnetic recording tapes. U.S. Pat. Nos. 3,778,308, 4,267,238 and 4,268,556 disclose the use of perfluoro-polyethers (PPE) as lubricant protective layers for magnetic media. Improved wear resistance and corrosion protection were obtained, although some problems were encountered in firmly bonding the top coat lubricant to the magnetic recording layer.

The prior art generally teaches that the topcoat lubricant should be firmly anchored to the magnetic recording layer so that it cannot be easily removed. Removal would obviously reduce the lubricating powers of the surface coating, and/or cause clogging of the recording/playback heads, thus leading to a deterioration in the performance. The prior art teaches that an improvement in lubricant adhesion to the magnetic surface can be achieved by introducing a priming layer between the magnetic layer and the fluorinated topcoat.

The utility of such a primer layer is disclosed in U.S. Pat. No. 4,404,247, where its use improves the binding characteristics of the lubricant, and hence improves the endurance of the magnetic media. The aforementioned patent discloses a dual layer system consisting of an aromatic or heterocyclic polymerisable monomer and a vinyl aromatic polymer, sandwiched between the magnetic layer and the fluorinated topcoat.

Other solvent coated primer materials have been based on silane containing compounds. These include alkoxy silanes which were used with and without phosphate accelerating agent as disclosed in Japanese Patent Application Nos. JP60-029934 and JP60-038729, respectively. These systems were then topcoated with ethyl stearate in JP60-029934 and PPE in JP60-038729. U.S. Pat. No. 4,529,569 discloses the use of a primer layer of an amino functional alkoxy silane and a top coat of a functional PPE in which the functional group is a terminal carboxyl or sulfonic acid group.

SUMMARY OF THE INVENTION

It has now been found that the use of a particular primer layer in combination with a lubricant layer comprising a perfluoropolyether ("PPE") provides a protective lubricant coating having improved properties.

Therefore according to the invention there is provided a magnetic recording element comprising a substrate bearing a metallic thin film magnetic recording medium, the recording medium being covered by a two layer protective coating formed from (i) a primer layer comprising a primary or secondary amino functional alkoxy silane and one or more copolymerisable monomers bearing a plurality of vinyl groups and (ii) a second layer which is a lubricant layer comprising a functional perfluoropolyether.

The primer layer (i) is proximal to the recording medium whereas the lubricant layer (ii) is distal.

The magnetic recording elements of the invention provide particular improved properties in terms of endurance and head-wear compared with known recording elements. The protective coating has particular advantage since both the primer layer and the outer layer of PPE may be solvent coated thereby avoiding the sputtering and evaporating techniques prevalent in many of the prior art protective coating systems for magnetic recording elements.

It is postulated that the presence of amino groups provides reactive sites for the PPE such that the protective coating comprises a cured lubricant which is crosslinked to the primer layer thereby providing a highly stable lubricating protective surface.

DESCRIPTION OF THE PREFERRED EMBODIMENTS

Suitable substrates for use in the invention comprise any of the known substrates suitable for supporting magnetic recording media. The substrates may be flexible or rigid and include polyester, polyimide, glass and polycarbonate. A particularly preferred substrate is flexible polyimide.

The magnetic recording medium may comprise any of the known metallic thin film magnetic media. Suitable metallic thin film media include, for example, CoCr, CoNi and CoCrNi. A preferred magnetic recording media is CoCr alloy in a molar ratio 80:20.

The second layer is a lubricant layer and contains a functional perfluoropolyether. The functional PPE used in the invention must be capable of curing, crosslinking or polymerising with the amino functional alkoxy silane.

The perfluoropolyethers of the present invention preferably have the formula $$Q(R_f)_k C_a F_{2a} - Z \quad (A)$$

wherein:

Q represents a non-fluorinated chain attached to $R_f$ and terminated by a polymerisable group, $R_f$ represents a chain of two or more randomly distributed perfluoroalkylene oxide units which may be branched or straight chain structures, exemplified by the group consisting of $$\{C_a F_{2a} O\} \quad \text{and} \quad \{CF - CF_2 O\}$$
$$\qquad\qquad\qquad\qquad\qquad\qquad |$$
$$\qquad\qquad\qquad\qquad\qquad\qquad CF_3$$

wherein:

a is independently an integer of 1 to 4, k is the number of such units having a value from 2 to 300 such that the segment Rf preferably has a number average molecular weight of 500 to 10,000 (more preferably 500 to 6000), and $$-OC_a F_{2a+1} \text{ or } Q$$

The use of the term "independently" with reference to subscript a means that, while within each perfluoroalkylene oxide unit the subscripts a have the same number, the "a" may vary independently from one perfluoroalkylene oxide unit to another. Thus, Formula (A) encompasses polyethers in which $-CF_2O-$ and $-C_3F_6O-$ are bonded together as randomly repeating units in the molecule, the subscript "a" being 1 in the former unit and 3 in the latter unit. Typically the perfluoroalkylene oxide units will be $-CF_2O-$, $-C_{F_4}O-$, and/or $-C_3F_6O-$.

If Z is not Q, it preferably is $-OCF_3$, $-OCF_2CF_3$, or $-OCF(CF_3)CF_3$.

Preferred perfluoropolyether monomers are the ethylenically unsaturated monomers disclosed in U.S. Pat. No. 3,810,874 and U.S. Pat. No. 4,321,404 wherein Q of the above Formula (A) comprises a unit selected from $$H_2C=C-C-O-CH_2- \qquad (a)$$
$$\quad\;\; | \;\; ||$$
$$\quad\;\; R \; O$$

$$CH_2=C-C-NH- \qquad (b)$$
$$\quad\;\; | \;\; ||$$
$$\quad\;\; R \; O$$

$$H_2C=C-CH_2-O-CH_2-, \text{ or} \qquad (c)$$
$$\quad\;\; |$$
$$\quad\;\; R$$

$$H_2C=C-CH_2NH-CH_2- \qquad (d)$$
$$\quad\;\; |$$
$$\quad\;\; R$$

wherein:

R is hydrogen or methyl.

The preferred ethylenically-unsaturated perfluoropolyether monomers have the formula $$Q-CF_2O(CF_2CF_2O)_m(CF_2O)_n CF_2-Q$$

wherein:

Q is as defined above, and m and n designate the number of randomly distributed perfluoroethyleneoxy and perfluoromethyleneoxy units respectively, n and m having independent values, for example, from 1 to 200, and the ratio m/n is 0.2/1 to 5/1, preferably between 0.5/1 and 1/1 and most preferably 0.8/1. A preferred molecular weight range is 2000 to 4000.

Examples of polymerisable perfluoropolyether monomers useful in this invention are those of the following formulae:

Perfluoropolyether

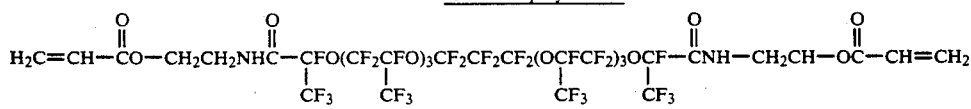  I

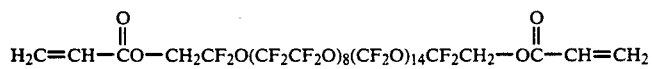  II

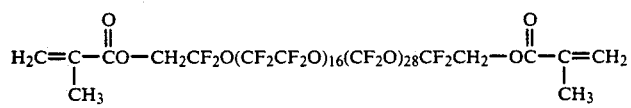  III

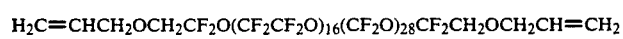  IV

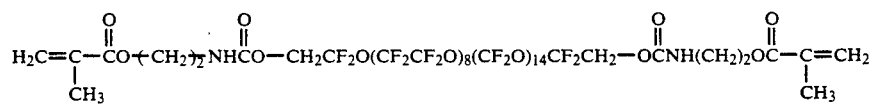  V

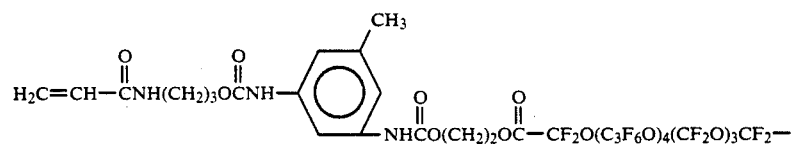  VI

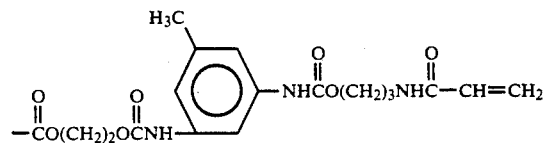

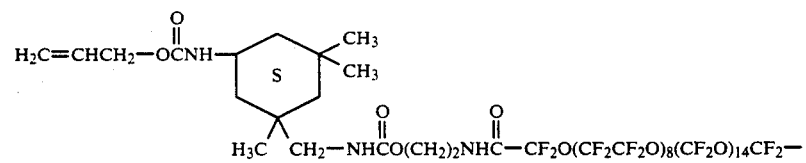  VII

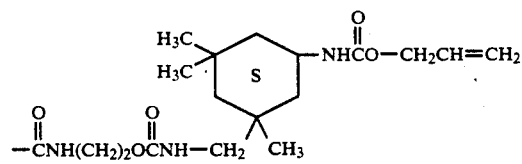

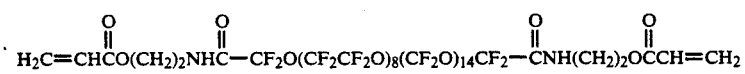  VIII

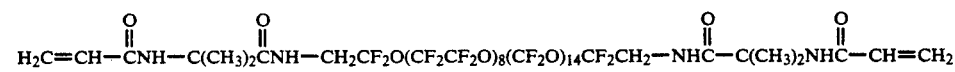  IX

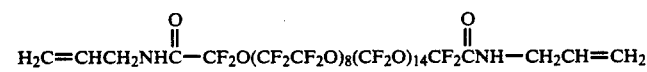  X

Preferably, the weight ratio of perfluoropolyether to primer is about 1:1 to 5:1. As that ratio increases over 5/1, the cohesiveness and the adhesion to the underlying substrate would be reduced.

In addition to the perfluoropolyether monomer, the solution used to apply the lubricant layer, i.e., the outer coating, may contain one or more copolymerisable monomers of other types in amounts up to about 25% by weight of the outer layer. However, the composite low surface energy covering is most effective if at least 75% of the weight of the outer layer is provided by perfluoropolyether segments. Useful copolymerisable monomers for this purpose include, for example, acrylic and methacrylic esters, amides, and urethanes, and vinyl ethers, esters, and heterocycles.

The primer layer contains an amino functional alkoxy silane. The amino functional alkoxy silanes should have at least one primary or secondary amine moiety, preferably with the primary or secondary amine in the three position from the silane (e.g. 3-amino propyltriethoxysilane). Preferred alkoxy silanes for use as primers in the present invention have the following general formula:

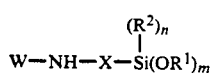  (B)

wherein:

$R^1$ represents a lower alkyl group having 1 to 3 carbon atoms;

$R^2$ represents a lower alkyl group having 1 to 3 carbon atoms;

m is 2 or 3 and n is 0 or 1 such that (m + n) = 3;

X is a lower alkylene moiety having from 2 to 5, and more preferably 3, carbon atoms and may optionally possess one or more substituents selected from OH, F and amino groups; and W is a hydrogen atom, a lower alkyl group having 1 to 4 carbon atoms, or a primary or secondary amine terminated lower alkyl group having 1 to 4 carbon atoms.

Examples of suitable amino functional alkoxy silanes include:

N-β-aminoethyl-gamma-aminopropyltrimethoxysilane,
N-β-aminoethyl-gamma-aminopropylmethyldimethoxysilane,
N-β-aminoethyl-gamma-aminopropyldimethylmethoxysilane,
3-aminopropyltriethoxysilane,
3-aminopropylmethyldiethoxysilane,
3-aminopropyldimethylethoxysilane,
3-aminopropylmethyldimethoxysilane,
bis[3-(triethoxysilyl)propyl]amine,
N,N'-bis[3-(trimethoxysilyl)propyl]ethylenediamine,
N-methylaminopropyltriethoxysilane,
N-methylaminopropylmethyldiethoxysilane,
methyl-3-[2-(3-trimethoxysilylpropylamino)ethylamino]-3-propionate,
methyl-3-[2-(3-methyldimethoxysilylpropylamine)ethylamino]-3-propionate,
trimethoxysilylpropylallylamine,
methyldimethoxysilylpropylallylamine,
trimethoxysilylpropyldiethylenetriamine,
methyldimethoxysilylpropyldiethylenetriamine,
p-aminophenyltrimethoxysilane,
p-aminophenylmethyldimethoxysilane,
aminoethylaminomethylphenethyltrimethoxysilane,
aminoethylaminomethylphenethylmethyldimethoxysilane, Most preferred alkoxysilanes include N-β-amino ethyl-gamma-amino propyltrimethoxysilane, 3-amino propyltriethoxysilane, and 3-amino propyltrimethoxysilane.

The primer layer additionally comprises one or more copolymerisable monomers bearing a plurality of vinyl groups, e.g., a polyacrylate. Suitable copolymerisable monomers are disclosed, for example, in U.S. Pat. No. 4,249,011. Preferred copolymerisable monomers are of the general formula:

$A^1-Z^1-A^2$  (C)

in which $A^1$ and $A^2$ independently represent a group of the general formula:

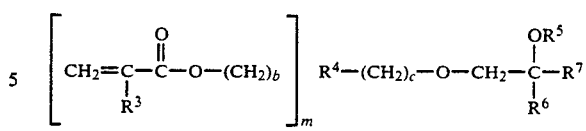

wherein:

$R^3$ and $R^6$ independently represent hydrogen or methyl, $R^4$ represents an aliphatic group of 1 to 15 carbon atoms and optionally one or two catenary (i.e. backbone) oxygen atoms or

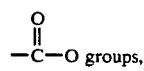 groups, $R^5$ is preferably hydrogen, but can be

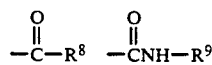

wherein:

$R^8$ is preferably alkenyl, but can be alkyl (each preferably having 2 to 5 carbon atoms), and can be substituted by a phenyl or carboxyl group, and $R^9$ is an aliphatic group (of up to 8 carbon atoms e.g. alkyl), an aryl group (preferably having up to 8 carbon atoms, and more preferably a phenyl group), or most preferably an acryloyloxyalkyl or a methacryloyloxyalkyl $R^7$ represents an alkylene group having 1 to 6 carbon atoms which may optionally possess one catenary oxygen atom; and $Z^1$ represents a heterocyclic group of the formula:

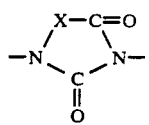

wherein:

X is a divalent group which is required to complete a 5- or 6-membered deterocyclic ring, preferably X is

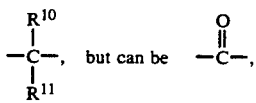

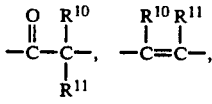

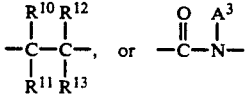

wherein:

$R^{10}$ to $R^{13}$ independently represent hydrogen or lower alkyl (of 1 to 4 carbon atoms), cycloalkyl (of 3 to 6 carbon atoms), or an aryl group of 6 to 12 carbon atoms and $A^3$ has the same definition as $A^1$ and $A^2$ above;

b is 0 or an integer of 1 to 6, c is an integer of 1 to 5.

m is an integer of 1 to 5.

Preferably m is 2 to 5, and most preferably 3.

Preferably, X is

wherein:

$R^{10}$ and $R^{11}$ are independently selected from H, $CH_3$ and $C_2H_5$.

It is also preferred that:

b is zero to 3, most preferably 1;

c is 1 to 5, most preferably 1;

$R^5$ is hydrogen;

$R^6$ and $R^3$ are independently hydrogen or $-CH_3$;

$R^7$ is an alkylene group having 1 to 3 carbons, most preferably $-CH_2$; and $R^4$ is an alkyl group with 1 to 4 carbon atoms, most preferably 1 carbon.

A particularly preferred copolymerisable monomer is hydantoin hexacrylate (HHA).

Compounds of Formula (C) can be prepared by the Lewis acid catalyzed reaction of the corresponding ethylenically unsaturated primary alcohol with an epoxy-substituted heterocycle incorporating the nucleus $Z^1$.

The polyglycidyl heterocyclic intermediates useful in the preparation of the compounds of the present invention are disclosed in U.S. Pat. Nos. 3,808,226 and 4,071,477. Preferably, the reaction is performed in solution. However, it also can be performed in the absence of solvent. Generally a solution of an epoxy-substituted heterocycle can be added incrementally to a mixture of (1) an ethylenically unsaturated primary alcohol (or mixtures of ethylenically unsaturated primary alcohols), (2) an inhibitor for thermal polymerization, and (3) a Lewis acid while maintaining the temperature of the mixture at 50° C. to 120° C., preferably about 80° C. to 100° C., until the disappearance of the epoxy group, as indicated by chemical titration or nuclear magnetic resonance spectrometric analysis. Heating the mixture for from 2 to 40 hours usually suffices to complete the reaction, after which volatiles are removed by vacuum distillation. The compounds can then be acylated by reaction with an acylating agent, preferably an acyl halide, an acyl anhydride, or an isocyanate that contains polymerizable ethylenically unsaturated groups.

The primer layer and/or the PPE-containing layer may contain a photoinitiator to accelerate the curing of the material. Suitable photoinitiators are known in the art and include benzildimethylketal, commercially available under the Trade Mark Irgacure 651.

The primer layer and PPE-containing layer are preferably coated from solution, e.g. by web coating, spin coating, spray coating, etc. The materials of the primer layer are generally coated from solvents such as ethanol, butanol, 1-methoxy-2-propanol, toluene and methylethylketone. The materials of the PPE-containing layer are generally coated from fluorinated solvents e.g., Fluorinert, FC43 and FC77, commercially available from Minnesota Mining & Manufacturing Co. The primer layer is generally coated to provide a dry coating thickness in the range 2 to 20 nm, preferably about 10 nm. The PPE-containing layer is generally coated at a coating thickness of 2 to 20 nm preferably about 10 nm. The use of thicker layers reduces the sensitivity of the material.

After coating, the layers are allowed to dry and are optionally irradiated with ultraviolet light to accelerate curing.

The invention will now be illustrated by the following Examples in which the following materials were used (a) PP-1:

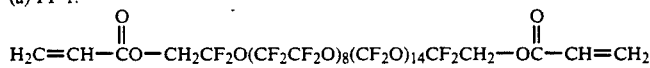

(b) HHA:

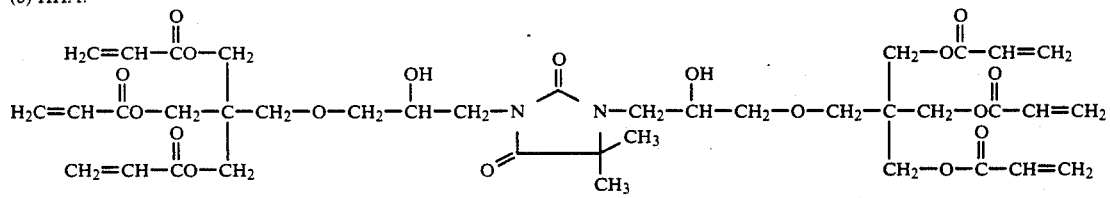

(c) bis-GMA:

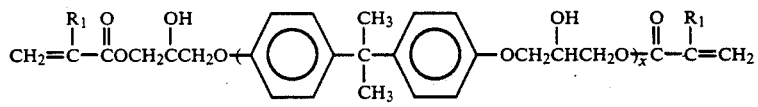

wherein R is $-CH_3$ (d) AMMO-silane:

$NH_2-CH_2-CH_2-CH_2Si(OCH_3)_3$

The magnetic recording elements used were in disc format, 5.25 in (13.3 cm) in diameter and comprised a polyimide base (thickness 25–50 μ) with a non-oxidized CoCr magnetic layer either evaporated or sputter deposited (thickness 0.2 to 0.5 μ) onto the base.

Primer and lubricating coatings were applied by spin-coating solutions in a clean room environment and allowing the coated samples to dry. The dispensed volume per layer was 10 ml at a coating speed of 100 rpm and thereafter at 1000 rpm for 30 seconds to evaporate the solvent.

Lubricant coatings were produced from a solution of PPP-1 in a solvent system containing 70:30 by volume mixture of Fluorinert FC77 and Fluorinert FC43, fluorinated solvents commercially available from Minnesota Mining & Manufacturing Co.

Primer coatings were produced from a solution in a solvent mixture of butanone and 1-methoxy-2-propanol (88:12 by volume), or ethanol (EtOH).

Each coating was inspected visually and microscopically, with its thickness and uniformity characterized non-destructively using ellipsometry. To ensure that losses, which occur in the recording process when the head is separated from the magnetic media, are kept to a minimum, coatings were produced in the thickness range 18 to 35 nm. After the coatings had been left to dry, they were tested for lifetime endurance using a lifetime tester (LTT) also situated in a clean room. The tester operated by rotating the lubricated sample underneath a stationary Nisshoku VHS video head, which was set with a head weight of between 2 and 2.5 grams. An alternating signal (typically 40kfc/i) was recorded and read on playback until a drop in output signal strength of 6dB was detected (this typically represents a drop in output signal of 75%). The test was then terminated, and the number of passes of the sample to failure was recorded.

Most samples were tested over four separate tracks, thus enabling an average endurance lifetime to be calculated. Due to the soft nature of the non-oxidized CoCr surface, no tests could be run on uncoated samples, as the magnetic head cut through the magnetic surface when placed on the rotating media.

EXAMPLE 1 (COMPARISON)

This Example evaluates known single layer lubricant systems. Magnetic recording elements were coated with a single layer of stearic acid and PPP-1 by the technique described above using the formulations reported in the following Table 1.

TABLE 1

| Protective Formulation | | Total Coating Thickness (± 1.5 nm) | Endurance | |
|---|---|---|---|---|
| Primer | Topcoat (all % are w/v) | | average passes | No. of Tracks tested |
| None | Stearic Acid (0.15%) | 18 | 89 | 4 |
| None | PPP-1 (0.6%) | 19 | NTP(4) | 4 |
| None | PPP-1 (0.9%) | 35 | 62 NTP(3) | 4 |

In this Example and the following Examples:

NTP = no test possible (The number in parenthesis indicates the number of tracks which could not be tested.); and w/v = with respect to volume.

It was possible to coat all formulations very uniformly, to form lubricating surfaces with low surface energies (10-25 ergs cm$^{-1}$). However, as can be seen from Table I, the lifetime endurances, measured in the number of repeated passes of the magnetic head, are extremely poor.

The material PPP-1 which is a perfluoropolyether of the type disclosed in Japanese Patent Application Nos. JP62-120619, JP59-127230 and HP59-107428 does not by itself afford any reasonable protection to the underlying metal surface. In fact, a coating thickness of approximately 35 nm was required before a test could be run.

EXAMPLE 2 (COMPARISON)

The prior art indicates that improvements to endurance can be achieved by placing a primer material between the PPE lubricant and magnetic recording surface. Simple alkoxy silanes have been used as primers usually of the chemical formula:

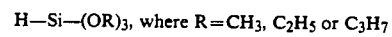

H—Si—(OR)$_3$, where R = CH$_3$, C$_2$H$_5$ or C$_3$H$_7$

Japanese Patent Application Nos. JP60-038729 and JP57-123535 describe the use of an alkoxy silane primer topcoated with a PPE lubricant. Other materials that have been used as primers include film forming aromatic or heterocyclic polymerisable monomers such as Bis-GMA (U.S. Pat. Nos. 4,404,247 and 4,526,833) and HHA (European Patent Application No. EP01864527).

Coated magnetic recording elements were prepared and tested by the techniques described above employing the formulations reported in the following Table 2.

TABLE 2

| Protective Formulation | | Thickness (± 1.5 nm) | Endurance | |
|---|---|---|---|---|
| Primer | Topcoat (all % are w/v) | | average passes | No. of Tracks tested |
| Alkoxy Silane (EtOH) (0.5%) | PPP-1 (0.3%) | 20 | NTP(4) | 4 |
| Alkoxy Silane (0.55%) | PPP-1 (0.3%) | 22 | NTP(4) | 4 |
| Alkoxy Silane (0.7%) | PPP-1 (0.3%) | 22 | NTP(4) | 4 |
| HHA (0.6%) | PPP-1 (0.3%) | 19 | NTP(4) | 4 |
| HHA (1.0%) | PPP-1 (0.3%) | 26 | 181 | 4 |
| Bis-GMA (0.05%) | PPP-1 (0.3%) | 16.5 | NTP(4) | 4 |
| Bis-GMA (0.1%) | PPP-1 (0.3%) | 20 | NTP(4) | 4 |

The Bis-GMA, HHA and alkoxy silane primers gave poor results. The alkoxy silane cited in the literature performed very badly, and even with a reduced head weight of 1.75 grams, no tests were possible, and the magnetic head cut straight into the metal surface.

EXAMPLE 3 (INVENTION AND COMPARISON)

This Example illustrates a protective formulation comprising a primer layer containign AMMO silane and HHA and a lubricating layer of PPP-1. The Example also shows, as a comparison, the use of a primer layer comprising AMMO silane and a primer layer comprising alkoxy silane and HHA.

The samples were prepared and tested by the technique described above using the formulations reported in the following Table 3.

TABLE 3

| Protective Formulation | | Total Thickness (± 1.5 nm) | Endurance | |
|---|---|---|---|---|
| Primer | Topcoat (all % are w/v) | | average passes | No. of Tracks tested |
| AMMO Silane (EtOH) (0.5%) | PP-1 (0.3%) | 22 | 8,383 | 4 |
| AMMO Silane (0.6%) | PPP-1 (0.3%) | 28 | 14,708 | 3 |
| AMMO Silane (0.7%) + | PPP-1 (0.3%) | 22 | 55,379 | 3 |

TABLE 3-continued

| Protective Formulation | | Total Thickness (± 1.5 nm) | Endurance | |
|---|---|---|---|---|
| Primer (all % are w/v) | Topcoat | | average passes | No. of Tracks tested |
| HHA (0.18%) AMMO Silane (0.7%) + HHA (0.18%) | PPP-1 (0.3%) | 31 | 61,689 | 4 |
| Alkoxy Silane (0.3%) + HHA (0.11%) | PPP-1 (0.3%) | 18 | NTP(4) | 4 |
| Alkoxy Silane (0.5%) + HHA (0.18%) | PPP-1 (0.3%) | 25 | NTP(4) | 4 |

Table 3 shows that large improvfements are obtained compared to the previous results when the amnio silane material is combined with the multifunctional material HHA, which is capable of chemical reaction with the active amino group sited on the propyl side chain of the silane. This use of the co-primer material for the protection of magnetic recording systems offers a greatly improved system over the prior art. Table J also shows that this improvement is not obtained when the multifunctional material is combined with the simple alkoxy silane.

EXAMPLE 4 (INVENTION)

Additional studies were made to investigate the advantages that this coprimer system has in terms of the ability to cure the fluorocarbon topcoat material to the coprimer material rather than the HHA material alone. The protective formulations employed were:-

HHA/AMMO+PPP-I: a primer layer comprising AMMO silane (0.7%) and HHA (0.25%) and a lubricant layer of PPP-1 (0.3%), HHA+PPP-1: a primer layer comprising HHA (1%) and a lubricant layer of PPP-1 (0.3%).

A photoinitiator, Irgacure 651 (Benzildimethylketal) was added to the primer material (5% by weight of the total weight):

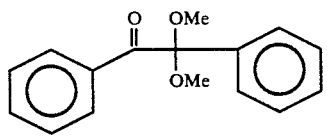

Curing was accomplished by UV exposure using an HPM 5000W lamp on a PL5000 exposure unit, under an inert atmosphere. The degree of cure was identified using FTIR (Nicolet 5SXB spectrometer) using a glancing angle reflectance (GAR) accessory and software. Spectra were recorded before and after solvent treatment of the coating in the lubricant solvent for two minutes. Uncured material dissolved away, leaving the coating with a certain retention of cured lubricant. The degree of cure is simply the ratio of the amount of lubricant retained compared to the original coating, given as % PPP-1 retained in Table 4.

TABLE 4

| | PPP-1 Retained | |
|---|---|---|
| Exposure Time(s) | HHA/AMMO + PPP-I | HHA + PPP-1 |
| 0 | 27 | 9 |
| 15 | 62 | 15 |
| 30 | 88 | 23 |
| 60 | 100 | 47 |

TABLE 4-continued

| | PPP-1 Retained | |
|---|---|---|
| Exposure Time(s) | HHA/AMMO + PPP-I | HHA + PPP-1 |
| 90 | 100 | 66 |
| 120 | 100 | 74 |

Table 4 shows, when the AMMO silane is present with the acrylate material, the degree of cure is much greater than for the acrylate only primer exposed for an identical length of time. The relative ease of cure provided by the coprimer, is an advantageous property of the system which is important in a web coating process.

EXAMPLE 5 (INVENTION AND COMPARATIVE)

Coated magnetic discs were prepared as in the previous Examples with a primer layer comprising AMMO silane or AMMO silane and HHA and a topcoat comprising Krytox or PPP-2. Krytox is a mono-functional PPE in which the functional group is carboxylic acid and is commercially available from Du Pont. PPP-2 is PPP-1 with the acrylate groups replaced by alcohol groups.

The formulations and endurance of the resulting discs are reported in the following Table 5.

TABLE 5

| Protective Formulation | | Endurance | |
|---|---|---|---|
| Primer | Topcoat | Average Passes | No. of Tracks tested |
| AMMO Silane (0.5%) | Krytox (0.3%) | 1,908 | 4 |
| AMMO Silane + HHA (0.5%) (0.18%) | Krytox (0.3%) | 5,266 | 4 |
| AMMO Silane (0.5%) (0.18%) | PPP-2 (0.3%) | NTP(4) | 4 |
| AMMO Silane + HHA (0.5%) (0.18%) | PPP-2 (0.3%) | 1,486 | 4 |

The results show the dual component primer of the invention provides significant improvements over a primer layer consisting of AMMO Silane alone with both the topcoat materials.

We claim:

1. A magnetic recording element, comprising:
   (a) a substrate;
   (b) a metallic thin film magnetic recording medium deposited onto the substrate; and
   (c) a protective coating deposited directly onto the metallic thin film magnetic recording medium, said protective coating comprising:
      (i) a primer layer proximal to the metallic thin film magnetic recording medium, said primer layer comprising an amino functional alkoxy silane and a copolyermisable monomer which comprises a plurality of vinyl groups; and
      (ii) a lubricant layer distal from the metallic thin film agnetic recording medium, said lubricant layer comprising a functional perfluoropolyether, wherein the functional perfluoropolyether is of the formula:

$Q(R_f)_k C_a F_{2a} - Z$, wherein:
Q comprises a non-fluorinated chain which is terminated by an unsaturated polymerisable gruop;

$R_f$ represents a chain of two or more randomly distributed perfluoroalkylene oxide units;

Z is selected from the group consisting of:

$-OC_aF_{2a+1}$ and Q;

a is independently an integer of 1 to 4; and k is an integer from 2 to 300.

2. The magnetic recording element as claimed in claim 1, wherein the amino functional alkoxy silane is of the general formula:

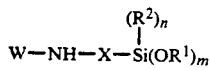

wherein:

R$^1$ represents a lower alkyl group having 1 to 3 carbon atoms;

R$^2$ represents a lower alkyl group having 1 to 3 carbon atoms;

m is 2 or 3 and n is 0 or 1 such that (m+n)=3;

X is a lower alkylene moiety having from 2 to 5 carbon atoms and comprising substituents selected from the group consisting of H, OH, F, and amino groups; and W is selected from the group consisting of H, a lower alkyl group having 1 to 4 carbon atoms, a primary amine terminated lower alkyl group having 1 to 4 carbon atoms, and a secondary amine terminated lower alkyl group having 1 to 4 carbon atoms.

3. The magnetic recording element as claimed in claim 2, wherein the amino functional alkoxy silane is selected from the group consisting of N-β-amino ethyl-gamma-amino propyltrimethoxysilane, 3-amino propyltrimethoxysilane, and 3-amino propyltriethoxysilane.

4. A magnetic recording element as claimed in claim 1, wherein the copolymerisable monomer has the general formula:

$$A^1-Z^1-A^2$$

wherein A$^1$ and A$^2$ independently represent a group of the general formula:

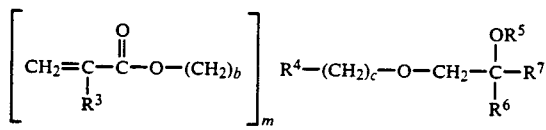

and Z$^1$ is a heterocyclic group of the general formula:

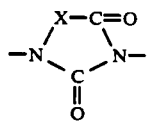

wherein:

R$^3$ and R$^6$ independently are selected from the group consisting of hydrogen and methyl;

R$^4$ is selected from the group consisting of an aliphatic group of 1 to 15 carbon atoms, an aliphatic group of 1 to 15 carbon atoms which contains from 1 to 2 catenary oxygen atoms, and an aliphatic group of 1 to 15 carbon atoms which contains a group of the formula

R$^5$ is selected from the group consisting of a hydrogen atom,

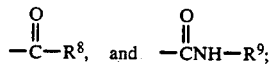

R$^7$ is selected from the group consisting of an alkylene group having 1 to 6 carbon atoms and an alkylene group having 1 to 6 carbon atoms which contains a catenary oxygen atom;

R$^8$ is selected from the group consisting of an alkenyl group having up to 5 carbon atoms, an alkenyl group having up to 5 carbon atoms which is substituted with a phenyl group, an alkenyl group having up to 5 carbon atoms which is substituted with a carboxyl group, an alkyl group having up to 5 carbon atoms, an alkyl group having up to 5 carbon atoms which is substituted with a phenyl group, and an alkyl group having up to 5 carbon atoms which is substituted with a carboxyl group;

R$^9$ is selected from the group consisting of an aliphatic group having up to 8 carbon atoms, and an aryl group having up to 8 carbon atoms;

X is a divalent group which is required to complete a 5- or 6- membered heterocyclic ring;

b is 0 or an integer from 1 to 6;

c is an integer from 1 to 6; and m is an integer from 1 to 5.

5. The magnetic recording element as claimed in claim 4, wherein X is selected from the group consisting of

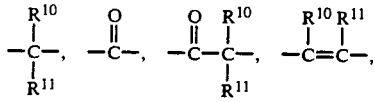

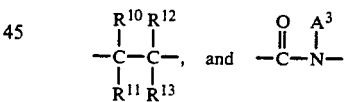

wherein:

R$^{10}$ to R$^{13}$ independently are selected from the group consisting of hydrogen, lower alkyl of 1 to 4 carbon atoms, cycloalkyl of 3 to 6 carbon atoms, and an aryl group of 6 to 12 carbon atoms; and A$^3$ has the same definition as A$^1$ and A$^2$ in claim 4.

6. The magnetic recording element as claimed in claim 4, wherein:

m is 2 to 5; and

X is

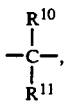

wherein:

R$^{10}$ and R$^{11}$ are independently selected from the group consisting of H, CH$_3$, and C$_2$H$_5$.

7. The magnetic recording element as claimed in claim 4, wherein:

b is 1;

c is 1;

$R^5$ is hydrogen;

$R^6$ and $R^3$ are independently selected from the group consisting of hydrogen and $-CH^3$;

$R^7$ is an alkylene group having 1 to 3 carbon atoms; and $R^4$ is an alkylene group with 1 to 4 carbon atoms.

8. The magnetic recording element as claimed in claim 1 in which the copolymerisable monomer is hydantoin hexacrylate.

9. A magnetic recoridng element as claimed in claim 1, wherein Z is selected from the group consisting of $-OCF_3$, $-OCF_2CF_3$, and $-OCF(CF_3)-CF_3$ 10. A magnetic recording element as claim in claim 1, wherien Q is a polyermisable group selected from the group consisting of:

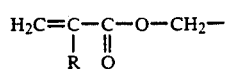 (a)

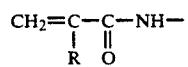 (b)

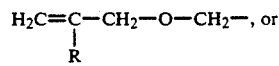 (c)

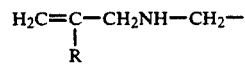 (d)

wherein R is selected from the group consisting of hydrogen and methyl.

11. A magnetic recording element as claimed in claim 1, wherein the perfluoropolyether is of the formula:

$$Q-CF_2O(CF_2CF_2O)_m(CF_2O)_nCF_2-Q$$

wherein m and n designate the nubmer of randomly distributed perfluoroethyleneoxy and perfluoromethyleneoxy units, respectively, n and m having independent values from 1 to 200, and the ratio m/n is from 0.2/1 to 5/1.

* * * * *

UNITED STATES PATENT AND TRADEMARK OFFICE
CERTIFICATE OF CORRECTION

PATENT NO. : 5,178,954  Page 1 of 2
DATED : January 12, 1993
INVENTOR(S) : Norman et al.

It is certified that error appears in the above-identified patent and that said Letters Patent is hereby corrected as shown below:

Col. 2, line 2, "what" should be --that--.

Col. 4, line 21, "-OC$_a$F$_{2a+1}$ or Q" should be
--Z is -OC$_a$F$_{2a+1}$ or Q--.

Col. 4, line 32, "-C$_{F4}$O-" should be -- -C$_2$F$_4$O- --.

Col. 8, line 33, "kyl" should be --kyl group,--.

Col. 9, line 4, "5." should be --6, and--.

Col. 9, line 31 "(a) PP-1:" should be --(a) PPP-1:--.

Col. 10, line 30, "were" should be --were used:--.

Col. 10, line 53, "R" should be --R$_1$--.

Col. 10, line 62, "0,2" should be --0.2--.

Col. 12, line 19, "EPO1864527" should be --EPO186427--.

Col. 12, line 50, "containign" should be --containing--.

Col. 12, line 64, "PP-1" should be --PPP-1--.

Col. 13, line 16, "improvfements" should be --improvements--.

UNITED STATES PATENT AND TRADEMARK OFFICE
CERTIFICATE OF CORRECTION

PATENT NO. : 5,178,954
DATED : January 12, 1993
INVENTOR(S) : Norman et al.

It is certified that error appears in the above-identified patent and that said Letters Patent is hereby corrected as shown below:

Col. 14, line 59, "agnetic" should be --magnetic--.
Col. 14, line 68, "gruop" should be --group--.
Col. 17, line 19, "recoridng" should be --recording--.
Col. 17, line 25, the first instance of "claim" should be --claimed--.
Col. 17, line 26, "wherien" should be --wherein--.
Col. 17, line 26, "polyermisable" should be --polymerisable--.
Col. 18, line 23, "nubmer" should be --number--.

Signed and Sealed this

Seventh Day of December, 1993

BRUCE LEHMAN

Attest:

*Attesting Officer*          *Commissioner of Patents and Trademarks*